Feb. 9, 1960
D. G. BEREMAND
2,924,359
EXPULSION BAG FUEL TANK
Filed Feb. 15, 1957
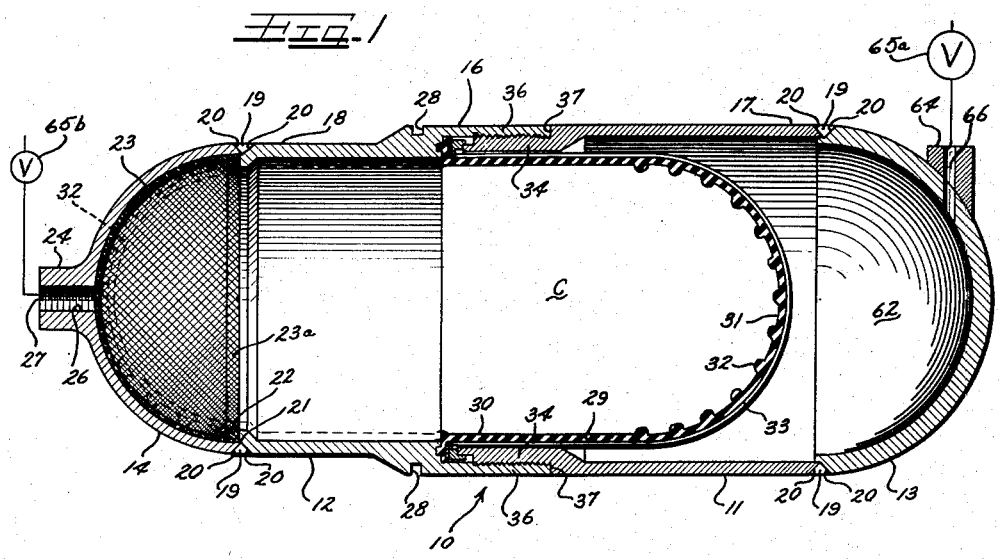
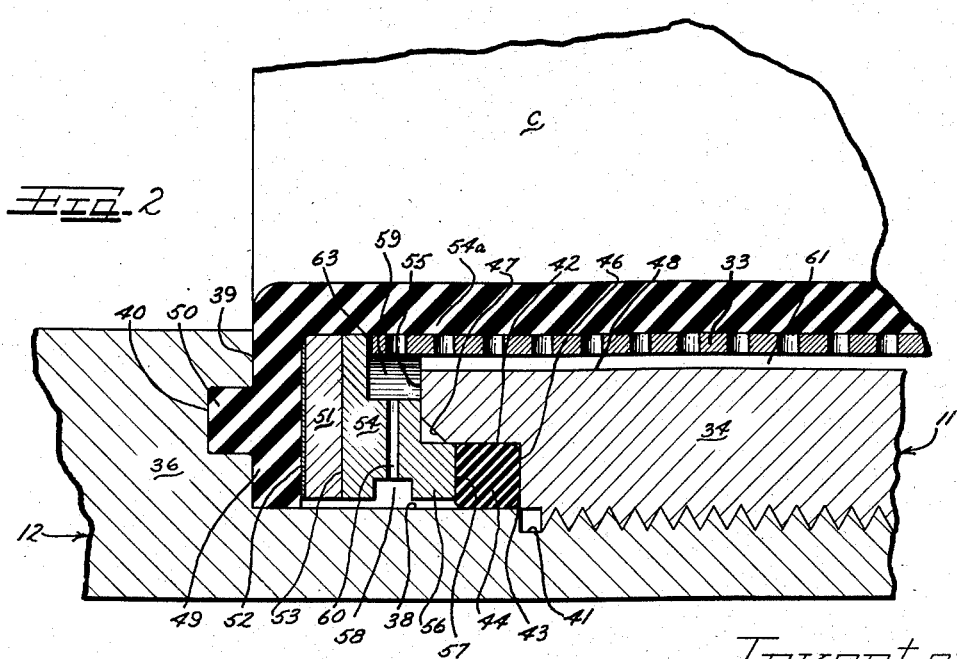
Inventor
DONALD G. BEREMAND

United States Patent Office 2,924,359
Patented Feb. 9, 1960

2,924,359

EXPULSION BAG FUEL TANK

Donald G. Beremand, Bay Village, Ohio, assignor to Thompson Ramo Wooldridge, Inc., a corporation of Ohio Application February 15, 1957, Serial No. 640,426

8 Claims. (Cl. 222—386.5)

This invention relates to an improved compartmented tank for use in aircraft and missiles that is adapted to store a supply of fuel under pressure and thus eliminate the formation of vapor pockets and maintain the fuel in a condition of immediate availability at a point of utilization in the aircraft. More particularly, this invention relates to a compartmented fuel tank equipped with an inner collapsible expulsion bag that is supported by an apertured rigid inner tank liner to prevent failure of the bag under extreme load conditions such as may occur during rapid acceleration of the aircraft.

One of the problems being encountered in operation of supersonic aircraft, missiles and rockets is the maintenance of a constant pressurized flow of fuel from the tanks to the engine of the aircraft during extreme accelerational, high altitude and varying temperature conditions. When the aircraft is rapidly changing altitude or is under the influence of extreme acceleration forces as, for example, in the launching, the supply of fuel from a conventional constant volume tank becomes erratic, if not completely interrupted, due to the formation of vapor pockets as a result of expansion and contraction of the fuel from the extreme temperature differentials encountered with altitude changes, or as a result of a complete displacement of the mass of the fuel away from the outlet of the tank.

The present invention offers one solution to this problem in the form of an improved variable volume expulsion bag fuel tank, such as is used in auxiliary power units for supersonic aircraft and missiles that will store a supply of fuel in the tank under pressure in a ready flow condition and substantially eliminate the formation of vapor pockets due to expansion and contraction of the fuel, regardless of altitude and temperature changes or a shifting of the fuel mass from imposed accelerational or G-load forces.

Briefly described, the present invention contemplates a generally cylindrical rigid metal tank for storing a monopropellant type fuel, such as ethylene oxide. The tank has a fuel discharge outlet at one end, a pressurizing chamber inlet at its other end, and includes an inner collapsible impervious bag or diaphragm which divides the tank into two separate chambers, one chamber normally occupying most of the tank capacity and being filled with the fuel. The second chamber is adapted to receive a charge of pressurized fluid, such as nitrogen to maintain the fuel chamber and enclosed fuel at a predetermined minimum pressure and thus eliminate vapor pockets in the fuel chamber portion of the tank. The bag opens toward the fuel discharge outlet and has a closed end or bottom normally positioned close to the other end of the tank. The bag is collapsible into the outlet end of the tank, whenever a valve in the fuel line is opened to permit the fuel to be expelled through the outlet, thereby providing the variable volume fuel tank feature of the invention. A complementally contoured apertured fuel bag support encloses the resilient inner bag liner to rigidify the bag liner against extreme accelerational forces that may be developed.

The second pressurizing chamber is filled with a quantity of inert fluid, such as nitrogen, from an external source and is sealed while under pressure to maintain a collapsing compression stress on the inner bag, thereby collapsing the bag toward the discharge outlet of the tank as the fuel flows from the outlet and eliminating the formation of vapor pockets.

Provision is also made for maintaining the inner liner in spaced relationship from the discharge end of the tank when the bag is collapsed, thus preventing the inner liner from prematurely closing the discharge outlet of the tank before the tank is completely emptied.

It is an object then of the present invention to provide an improved expulsion bag tank.

Another object of the present invention is to provide an improved expulsion bag tank for use in aircraft and missiles that will store a supply of fuel in a ready flow condition, regardless of the expansion and contraction of the fuel, operating acceleration imposed, altitude of the aircraft and temperature conditions.

Still another object of the present invention is to provide a variable volume tank that will insure complete emptying of the contents of the tank, even in the absence of gravity.

A further object of the present invention is to provide an improved compartmented expulsion bag fuel tank having a fuel storage chamber and a pressurizing chamber defined by the bag, such that a pressurized supply of fuel can be stored in the storage chamber portion of the tank in a ready flow condition under the influence of an inert pressurized fluid in the pressurizing chamber.

Another object of the present invention is to provide an improved compartmented expulsion bag fuel tank that will effectively store a supply of pressurized fuel in a ready condition for usage, without the presence of vapor pockets, regardless of the acceleration forces present, altitudes or speed conditions imposed on the tank.

A still further object of the present invention is to provide an improved expulsion bag tank having a resilient inner tank liner and a rigid apertured liner support to prevent the bag from rupturing during extreme acceleration conditions.

Many other objects and advantages of the present invention will become manifest to those versed in the art upon making reference to the accompanying sheet of drawings and detailed description which follows, that form a part of this specification.

In the drawings:

Figure 1 is a longitudinal cross-sectional view of the expulsion bag tank of the present invention; and Figure 2 is an enlarged fragmentary longitudinal cross-sectional view of the sealed juncture area between the outer tank casing halves and inner bag liner of the present invention.

As shown on the drawings:

In Figure 1, the expulsion bag tank assembly is designated by the reference numeral 10, and is comprised generally of a first fuel tank tubular body half 11, a second fuel tank tubular body half 12, a domed or semispherical head cap 13, and a discharge domed or semispherical end cap 14. The first and second body portions 11 and 12, respectively, are centrally circumferentially joined around an area of juncture 16, substantially along the mid-point of the longitudinal axis of the expulsion bag tank assembly 10. A more detailed explanation of the structural details at the circumferential juncture point 16 will follow later.

The caps 13 and 14 are respectively fastened to the outer open end portions 17 and 18 of the first and second fuel tank body halves 11 and 12, respectively, for example by a peripheral weld 19, the respective tank body and cap members, being appropriately chamfered as at 20 to provide a sufficiently large weld area for the weld 19.

It should be understood that any other conventional type of fastening technique could be utilized to connect the caps 13 and 14 to the fuel tank body halves 11 and 12, respectively, such as a screw thread or riveted type of construction.

The end portion 18 of the second fuel tank body half 12, is inwardly offset to provide a reduced diameter pilot portion 21 and peripheral shoulder 22 around the inner periphery of the discharge cap 14. A semi-spherical screen cup 23, sized to hug the inner face of the cap 14, has a base ring 23a bottomed by the shoulder 22 to be locked in the cap.

The discharge cap 14 is formed with a longitudinally extending boss 24, that is bored and internally threaded as at 26 to form a discharge outlet 27 for the expulsion bag tank assembly 10.

An annular groove 28 is formed in the outer periphery of the second tank body part 12, substantially adjacent the juncture point 16, to receive a bracket (not shown) for mounting of the expulsion bag tank assembly 10.

In order to provide the variable volume feature of the present invention, a resilient, corrosion resistant bag 29 is provided in the fuel tank assembly 10, the bag 29 may be complementally contoured, for example, to the internal surface configurations of the first tubular tank body half 11 and head cap 13. The bag 29 may be constructed of any flexible corrosion resistant material, such as neoprene or plastic, that will not be attached by the fuel and that will maintain the fuel and pressurized fuel separated during long periods of storage while under pressure. The bag coacts with the casing half 12 and end cap 14 to define a fuel chamber C which substantially occupies the interior of the tank 10.

As illustrated in Figure 1, the bag 29 is formed, for example, with a cylindrical side wall portion 30 and a hemispherical end portion 31. The internal surface of the end portion 31 is provided with a plurality of raised projections or nubbins 32, at spaced intervals, for a purpose that will be explained in more detail later.

In order to support the bag 29 in spaced relationship from the walls of the first tank body half 11, a thin perforated shell 33 is provided in the tank, preferably constructed from thin sheet metal, to surround the bag that serves not only to prevent sagging and rupture of the bag 29 during extreme accelerational conditions when the bag is full, but also to prevent excessive heat transfer to the contents of the bag through the walls of the fuel tank assembly 10. The open end of the shell 33 is secured in the junction area 16 of the tank tubes 11 and 12.

As best shown in Figure 1, the first and second body portions 11 and 12, respectively, of the tank assembly 10, include a complemental pair of external and internally threaded end portions 34 and 36, respectively, the externally threaded end portion 34 being thickened and turned down to provide a shoulder 37 (Figure 1), against which the end portion 36 bears in abutting flush fitting engagement.

As best shown in Figure 2, the threaded end portion 36 is counterbored as at 38 to form an internal shoulder 39. The shoulder 39 includes a longitudinal circumferential groove 40, for a purpose which will be explained in more detail later.

The threaded end portion 36 also includes a circumferential groove 41 to provide end clearance for the threads on the engaging end portion 34, when the respective tank body portions 11 and 12 are engaged.

The threaded end portion 34 includes a reduced diameter portion 42 which cooperates with the counterbore 38 of the threaded end portion 36, to form a circumferential groove 43, in which is positioned an annular O-ring seal 44. The reduced diameter portion 42 thus forms a retaining shoulder 46 for the O-ring seal assembly 44. The innermost end portion of the reduced diameter surface 42 is chamfered as at 47 to facilitate installation of the O-ring seal assembly against the shoulder 46.

The thickened threaded end 34 has an internal bore 48 large enough to provide radial clearance between the perforated shell 33 and threaded end portion 34.

The open end of the bag 29 is formed with an annular outturned flange 49, having an outer diameter approximating that of the counterbore 38 in the threaded end portion 36 to fit snugly in the counterbore. A complemental circumferential rib 50 is formed in the outer end face of the flange 49, to engage the groove 40 in the end portion 36, and thereby provide a pressure tight seal between the bag 29 and second tank body half 12. A metal ring 51 is bonded to the inner end face of the flange 49 at 52, as by vulcanizing, for example, to more evenly distribute longitudinal bearing pressure against the shoulder 39, and also to provide a bearing surface 53 to accommodate torsional sliding rotation across its surface when the tank halves 11 and 12 are being assembled or dismantled. The ring 51 fits freely in the bore 38.

An annular back-up ring 54 is positioned between the ring 51 on the bag 29 and the threaded end 34 of the body half 11, and is retained in clamped engagement between the bag retaining ring 51 and an end wall 55 of the threaded end portion 34. The ring 54 is formed with a longitudinally extending flanged portion 56, to form an end retaining wall 57 for the O-ring seal 44.

The ring 54 fits freely in the bore 38 and has a circumferential channel 58 therearound, and a plurality of circumferentially spaced internal channel wells 59, (preferably four) behind retaining ring 51. A plurality of radial passages 60 provide communication between the channel 58 and wells 59.

The bore 48 is of such a dimension as to provide a cylindrical passage 61 between the supporting shell 33 and the threaded end portion 34, and thus vent the wells 59 and circumferential channel 58 to collapsing bag pressure in a pressure reservoir chamber 62, formed between the head cap 13 and body half 11. By thus venting the wells 59 and circumferential channel 58 to the pressure in the reservoir chamber 62, it will be observed from Figure 2 that the seal between the circumferential rib 50 of the bag 29, when seated in the circumferential groove 40 in the threaded end portion 36, will never be exposed to any appreciable differential pressure, but will thus act basically as a separator between the fuel and the pressurizing gas.

In addition, since the external O-ring seal 44 is on the nitrogen side of the tank it need only seal against nitrogen. Should a leak occur at the external seal 44, nitrogen rather than fuel would thus be expelled, which otherwise might present a safety hazard.

The perforated bag supporting shell 33 encloses the bag 29 in supporting surface contact relationship and surrounds a pilot portion 54a of the end 34. The open end of the perforated shell 33 is fastened to the ring 54 at 63 by brazing or welding.

As best shown in Figure 1, a boss 64 is formed on the head cap 13 and is bored as at 66 to introduce fuel propelling fluid such as pressurized nitrogen or other inert gas into the chamber 62. After the chamber 62 has been charged to a suitable pressure with a supply of pressurizing fluid, a shutoff valve 65a may be actuated to seal the chamber before the stored fuel has been expelled through the discharge outlet 27. A flow valve 65b may be incorporated in the fuel discharge line to selectively institute a flow of the pressurized fuel to the engine, or point of utilization, both valves being represented diagrammatically in Figure 1.

Thus it will be appreciated that the composite mounting and seal arrangement at the juncture point 16 illustrated in Figure 2, not only provides a pressure sealed engagement between the respective tank body halves 11 and 12, and the inner resilient bag 29, but accommodates a torsional slipping movement between the annular ring 51 and backup ring 54 along the radial bearing surface 53 when the tank body parts are screwed together, thus preventing twisting of the bag and a consequent failure of the bag.

In operation, when the respective fuel tank body halves 11 and 12 have been screwed together in assembled relationship, and flow valve 65b has been opened to permit chamber C of the inner bag 29 to be filled with fuel, the fuel tank assembly 10 will assume the general spacial arrangement illustrated in solid line in Figure 1. The supporting shell 33 will then peripherally enclose and support the bag 29, and thus prevent the bag from rupturing or failing from extreme accelerational displacements, altitude and temperature change conditions.

In order to pressurize the supply of fuel in the chamber C and assure the availability of the fuel in a ready flow condition, it will then be necessary to charge the chamber 62 with pressurized fluid, such as nitrogen gas. To this end, the flow valve 65b is first closed to prevent a premature discharge of the fuel from the storage chamber C. Thereafter the shutoff valve 65a is opened and pressurized fluid admitted into the chamber 62 until a predetermined pressure has been attained, sufficient to assure complete emptying of the contents of the bag 29, regardless of the imposed altitude and temperature conditions. When the desired pressure is obtained in the chamber 62, the shutoff valve 65a may be closed, and the tank assembly 10 is then ready for use.

When it is desired to institute a fuel flow through the outlet 27 an operator need only open the flow valve 65b, and thus permit the pressurized fluid in the chamber 62 to collapse the bag toward the discharge cap 14 and expel fuel through the outlet 27. As fuel continues to be expelled from the bag 29, the bag will collapse toward the discharge cap 14 until the nubbins 32 on the inner wall of the bag, come into engagement with the screen 23. When fully collapsed the bag 29 will assume a position indicated in dotted line in Figure 1 and the chamber 62 will occupy all of the tank interior thus assuring discharge of all of the fuel from chamber C.

Thus it will be appreciated that the projections or nubbins 32 on the bag 29 cooperate with the screen 23 on the discharge cap 14, to prevent the bag from blocking off the discharge outlet 26 before all of the fuel in the bag has been discharged through the outlet.

It should be understood, that under certain designed operating conditions, only the nubbins 32 or the contoured screen 23 would be required to maintain the bag 29 in spaced relationship from the inner wall of the cap 14 to prevent blocking of the discharge outlet 27.

While only one specific embodiment of the present invention has been herein disclosed, it should be understood that many other modifications and variations may be effected without departing from the novel concepts herein disclosed.

I claim as my invention:

1. An expulsion bag tank adapted to maintain a pressurized supply of fuel in a ready flow condition for use in aircraft and missiles that are subject to extreme accelerational forces, altitude and temperature changes which comprises a first tank part, a second tank part threadingly connected to said first tank part, said first tank part having an inlet formed thereon, said second tank part having a discharge outlet on the outer end thereof, an internal non-pervious flexible diaphragm in said tank dividing said tank into a storage chamber and a pressure chamber, a pervious rigid diaphragm support wholly disposed in said first tank part in spaced relation to the inner wall thereof and supporting said diaphragm in a normally fully extended position wholly within said first part, a screen wholly disposed in said second tank part and contoured to conform to engage the interior thereof in overlying relation to said discharge outlet, said flexible diaphragm having a plurality of spaced nubbins formed thereon to bottom on the screen and maintain said diaphragm in spaced relationship from said discharge outlet when the diaphragm is directed into said second tank part, resilient seal means between said first and second tank parts and spaced from said diaphragm, and means for pressurizing said pressure chamber, said diaphragm being responsive thereto and directable to a position wholly within said second tank part.

2. An expulsion bag tank adapted to maintain a pressurized supply of fuel in a ready flow condition for use in aircraft and missiles, or the like, comprising a longitudinally elongated cylindrical tank body, said tank body including a head end having an inlet and a discharge end having an outlet formed therein, a flexible diaphragm in said tank body dividing said tank into a storage chamber and a pressure chamber, a pervious diaphragm supporting member enclosing said diaphragm to support the same in spaced relation to said head end of said tank, the mouth of said diaphragm including peripheral seal means having a resilient surface operative to preclude leakage in either direction betwen said chambers, additional seal means axially spaced from said peripheral seal means which additional seal means is operative to preclude leakage from said pressure chamber out of said tank; said peripheral seal means being constructed to define an annular passage axially intermediate said resilient surface and said additional seal means, said passage being disposed radially outwardly of and remotely from said pressure chamber and adapted to trap any fuel leakage past said resilient surface at a point intermediate said peripheral and said additional seal means remotely from said pressure chamber, means for maintaining said diaphragm in spaced relationship from the discharge end of said tank when said diaphragm is in a collapsed position, and pressurizing means in said pressure chamber to expel the contents of said tank through said outlet regardless of accelerational forces acting on said expulsion bag tank.

3. A variable volume tank adapted to store a supply of fuel under pressure without the presence of vapor pockets for use in aircraft and missiles or the like, comprising separable first and second tank body parts, an end cap having an inlet formed thereon joined to said first body part, a discharge cap having an outlet formed thereon joined to said second body part, said first and second body parts being threadingly engageable with each other, a resilient cup-shaped diaphragm bag in said tank having an annular flange connected thereto at the point of juncture of and disposed between said first and second body parts for joint compression by said threaded body parts, said resilient bag defining a chamber communicating with said outlet and including a maximum portion of the interior of said first and second tank body parts when in its free state and having a plurality of raised projections formed on its inner surface, seal means between said first and second tank body parts and spaced from said flange, said diaphragm also defining a pressure chamber in said tank, and a complementally contoured pervious diaphragm support member enclosing and supportingly engaging said diaphragm when said diaphragm is in its free position, said pressure chamber being adapted to receive a pressurized supply of fluid between said first tank part and said diaphragm support member to collapse said diaphragm toward said outlet to expel the contents therefrom.

4. A variable volume tank to store and completely expel a supply of fuel therefrom, without the formation of vapor pockets, and adapted for use in aircraft and missiles subject to operation under extreme accelerational conditions comprising a tank body having an inlet and a discharge outlet, a resilient bag forming an inner tank liner and dividing said tank into a storage chamber and a pressure chamber, a seal between said bag and tank body chambers, said discharge outlet registering with said storage chamber, said inlet registering with said pressure chamber, an annular passage providing communication between said seal and said pressure chamber, and means for admitting a supply of pressurized fluid to said pressure chamber to expel the contents from said storage chamber and to seal the juncture between said seal, said tank body and said resilient bag regardless of existing accelerational conditions.

5. An expulsion tank comprising in combination: a rigid casing having an outlet at one end and an inlet at the other end; a flexible bag dividing the tank into a storage chamber communicating with the outlet and a pressure chamber communicating with the inlet; a seal ring assembly surrounding the mouth of the bag and clamping the bag in sealed relation directly to the casing at a point intermediate said ends but slightly closer to said outlet than to said inlet, the movable portion of said bag being deflectable to positions where the bag is substantially entirely alternately situated on opposite sides of said point; and a bag support joined to said seal ring assembly and extending toward said inlet, and completely surrounding said bag only when it is deflected from said point toward said inlet, and terminating in spaced relation from said inlet.

6. In a pressurized tank having two joined body parts; a flexible diaphragm for dividing the tank into a storage and a pressure chamber; the diaphragm having a flange clamped between and surrounded by the body parts; and a seal adjacent to the flange, and disposed between and surrounded by the body parts, the improvement comprising: a fluid passageway intermediate the flange and the seal, said passageway freely communicating with the pressure chamber, whereby pressure in said passageway biases the flange and the seal in opposite directions.

7. In an expulsion tank including a rigid casing having two joined body parts and having an outlet at one end and an inlet at the other end, and a flanged-mouth flexible bag dividing the tank into a storage chamber communicating with the outlet and an expulsion chamber communicating with the inlet, the bag flange sealably engaging an annular shoulder in one of the body parts, the improvement of a seal ring assembly surrounding the mouth of the bag and securing the bag in sealed relation with the casing, said seal ring assembly comprising: a seal intermediate the body parts, and a rigid ring intermediate said seal and the bag flange, said ring having a passage for communicating that side of said seal and that side of the flange which are adjacent to said ring with the pressure chamber, whereby pressure in said passage biases the flange and said seal in opposite directions.

8. An expulsion tank comprising: a rigid hollow casing having an outlet at one end and an inlet at the other end; a flexible bag dividing the casing into a storage chamber communicating with the outlet and an expulsion chamber communicating with the inlet; and means for supporting said bag, said means including an annular seal ring assembly circumferentially surrounding the bag and clamping the mouth of said bag against said casing in sealed relation therewith, said means having a cup-shaped pervious portion the mouth of which comprises part of said seal ring assembly for surrounding and backing-up the remainder of said bag, the effective part of said cup-shaped portion being disposed entirely somewhat closer to said inlet than to said outlet, but spaced from said inlet, and operative to limit diaphragm movement in the direction of said inlet, said cup-shaped portion completely enclosing said bag when said expulsion chamber is at minimum size and neither enclosing nor backing-up said bag when said expulsion chamber is at maximum size.

References Cited in the file of this patent
UNITED STATES PATENTS

| | | |
|---|---|---|
| 382,610 | Holmes | May 8, 1888 |
| 1,122,270 | Goehring | Dec. 29, 1914 |
| 2,097,985 | Maryott | Nov. 2, 1937 |
| 2,324,701 | Herman | July 20, 1943 |
| 2,339,876 | Phillips | Jan. 25, 1944 |
| 2,347,379 | Teeter | Apr. 25, 1944 |
| 2,351,761 | Hanna | June 20, 1944 |
| 2,543,585 | Miller | Feb. 27, 1951 |
| 2,736,356 | Bender et al. | Feb. 28, 1956 |